(12) United States Patent
Dunjic et al.

(10) Patent No.: US 10,694,370 B2
(45) Date of Patent: Jun. 23, 2020

(54) SYSTEM AND METHOD FOR SELECTIVELY ENABLING A DATA TRANSFER METHOD

(71) Applicant: The Toronto-Dominion Bank, Toronto (CA)

(72) Inventors: Milos Dunjic, Oakville (CA); Perry Aaron Jones Haldenby, Toronto (CA); Arthur Carroll Chow, Markham (CA); Anthony Haituyen Nguyen, Toronto (CA); Het Anand Patel, Mississauga (CA); Casey Lyn Doyle, Ajax (CA); Yubing Liu, Toronto (CA); John Jong-Suk Lee, Toronto (CA); David Samuel Tax, Toronto (CA); Arun Victor Jagga, Toronto (CA)

(73) Assignee: The Toronto-Dominion Bank, Toronto, Ontario (CA)

( * ) Notice: Subject to any disclaimer, the term of this patent is extended or adjusted under 35 U.S.C. 154(b) by 215 days.

(21) Appl. No.: 15/726,560

(22) Filed: Oct. 6, 2017

(65) Prior Publication Data
US 2019/0110188 A1 Apr. 11, 2019

(51) Int. Cl.
*G06Q 20/08* (2012.01)
*H04W 8/20* (2009.01)
(Continued)

(52) U.S. Cl.
CPC ............ *H04W 8/205* (2013.01); *G06F 13/14* (2013.01); *G06F 16/214* (2019.01); *G06F 16/24* (2019.01);
(Continued)

(58) Field of Classification Search
CPC ........ G06Q 40/00; G06Q 30/00; G06Q 20/00; G06Q 10/00
(Continued)

(56) References Cited

U.S. PATENT DOCUMENTS 5,477,040 A 12/1995 Lalonde
6,134,590 A * 10/2000 Perlman ................ H04L 67/125
463/42

(Continued)

OTHER PUBLICATIONS

Iyengar et al., "Architecting Web Sites for high performance", Scientific Programming 10 (2002) 75-89, IBM Research, T.J. Watson Research Center. P.O. Box 704, Yorktown Heights, NY 10598, USA. (Year: 2002).*

(Continued)

*Primary Examiner* — Frantzy Poinvil
(74) *Attorney, Agent, or Firm* — Rowand LLP

(57) ABSTRACT

A computer system for selectively enabling a data transfer method is disclosed. The computer system includes a processor, a communications module, and a memory. The memory stores instructions that, when executed by the processor, cause the computer system to: receive a signal from a remote electronic device via a network using the communications module, the received signal representing information including a context for a transfer of value between a database record associated with a data sender and a database record associated with a data receiver, the context including an identifier for the data receiver; obtain a condition to be satisfied in performing the transfer of value based on the identifier for the data receiver; determine that the condition is satisfied by performing the transfer of value using a particular data transfer method; and enable the transfer of value using the particular data transfer method.

49 Claims, 4 Drawing Sheets

(51) Int. Cl.
*G06Q 20/38* (2012.01)
*G06F 13/14* (2006.01)
*G06F 16/24* (2019.01)
*G06F 16/27* (2019.01)
*G06F 16/21* (2019.01)
*G06Q 20/10* (2012.01)
*G06Q 20/32* (2012.01)
*G06Q 20/40* (2012.01)

(52) U.S. Cl.
CPC .......... *G06F 16/27* (2019.01); *G06Q 20/08* (2013.01); *G06Q 20/10* (2013.01); *G06Q 20/3223* (2013.01); *G06Q 20/38* (2013.01); *G06Q 20/405* (2013.01)

(58) Field of Classification Search
USPC ........................................................ 705/3–44
See application file for complete search history.

(56) References Cited

U.S. PATENT DOCUMENTS

| | | | |
|---|---|---|---|
| 7,225,156 B2 | 5/2007 | Fisher | |
| 7,515,697 B2* | 4/2009 | Eng | G06Q 30/04 379/114.01 |
| 7,693,790 B2 | 4/2010 | Lawlor et al. | |
| 7,725,393 B2* | 5/2010 | Drummond | G06F 3/023 705/43 |
| 7,840,465 B1 | 11/2010 | Juarez et al. | |
| 8,145,967 B2* | 3/2012 | Srinivasan | G06F 11/277 703/1 |
| 8,271,992 B2* | 9/2012 | Chatley | G06F 3/0613 718/105 |
| 8,306,879 B2* | 11/2012 | Nonaka | G06Q 20/10 705/30 |
| 8,332,375 B2* | 12/2012 | Chatley | G06F 3/0613 707/705 |
| 8,510,228 B2* | 8/2013 | Lu | G06Q 20/3674 705/16 |
| 8,527,408 B2* | 9/2013 | Campbell | G06Q 20/10 705/39 |
| 8,589,289 B1* | 11/2013 | O'Donnell | G06Q 40/02 705/35 |
| 9,292,852 B2 | 3/2016 | Kaplinsky | |
| 9,760,874 B2* | 9/2017 | Zaidi | G06Q 20/382 |
| 9,762,610 B1* | 9/2017 | Kwan | H04L 63/1458 |
| 2003/0061163 A1* | 3/2003 | Durfield | G06Q 20/04 705/44 |
| 2008/0189186 A1 | 8/2008 | Choi et al. | |
| 2008/0307841 A1* | 12/2008 | Huang | E05B 27/005 70/491 |
| 2012/0016728 A1 | 1/2012 | Ahmad et al. | |
| 2014/0195026 A1* | 7/2014 | Wieder | H04L 67/306 700/94 |
| 2015/0178693 A1 | 6/2015 | Solis | |
| 2015/0278811 A1 | 10/2015 | Lalchandani et al. | |
| 2017/0012840 A1* | 1/2017 | Zaidi | G06Q 20/382 |
| 2018/0337841 A1* | 11/2018 | Muraira | H04L 43/087 |

OTHER PUBLICATIONS

Jennings et al., "Resource Management in Clouds: Survey and Research Challenges", J Netw Syst Manage (2015) 23:567-619. DOI 10.1007/s10922-01409307-7 (Year: 2013).*

* cited by examiner

SYSTEM AND METHOD FOR SELECTIVELY ENABLING A DATA TRANSFER METHOD

TECHNICAL FIELD

The present application relates to databases, and, more particularly, to transferring value between database records.

BACKGROUND

Databases may include one or more records. Value may be transferred between records in a database or between records in more than one database.

Transfers of value between database records may be performed using a variety of data transfer methods. For example, in some cases it may be possible to perform a particular transfer of value using several data transfer methods. In other cases, some or all of those data transfer methods may be unsuitable.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
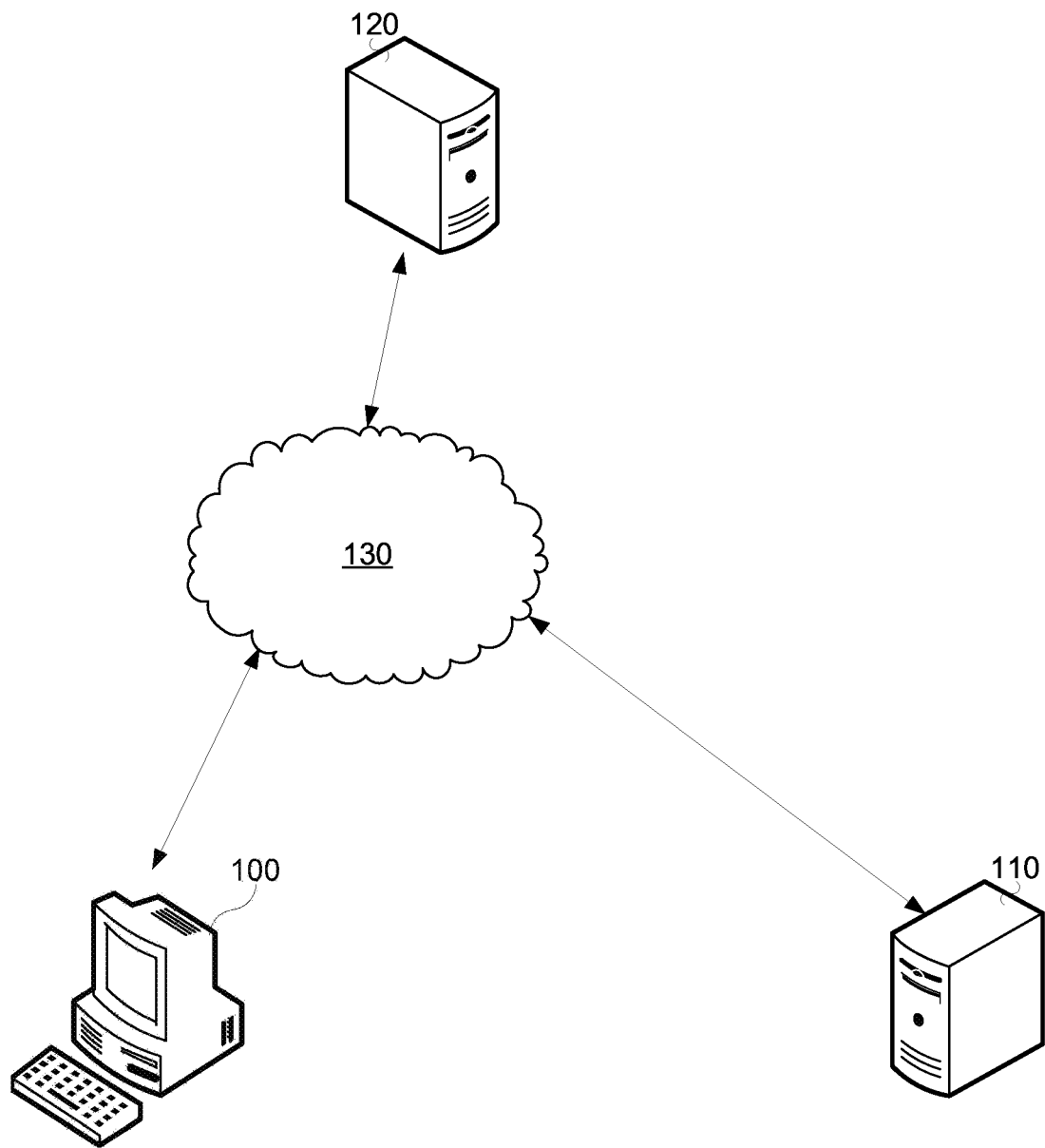
FIG. 1 is a schematic operation diagram illustrating an operating environment of an example embodiment.

In one aspect, there is provided a computer system, the computer system comprising: a processor; a communications module coupled to the processor; and, a memory coupled to the processor and storing instructions that, when executed by the processor, cause the computer system to: receive a signal from a remote electronic device via a network using the communications module, the received signal representing information including a context for a transfer of value between a database record associated with a data sender and a database record associated with a data receiver, the context including an identifier for the data receiver; obtain a condition to be satisfied in performing the transfer of value based on the identifier for the data receiver; determine that the condition is satisfied by performing the transfer of value using a particular data transfer method; and enable the transfer of value using the particular data transfer method.

In another aspect, there is provided a computer-implemented method comprising: receiving a signal from a remote electronic device via a network, the received signal representing information including a context for a transfer of value between a database record associated with a data sender and a database record associated with a data receiver, the context including an identifier for the data receiver; obtaining a condition to be satisfied in performing the transfer of value based on the identifier for the data receiver; determining that the condition is satisfied by performing the transfer of value using a particular data transfer method; and enabling the transfer of value using the particular data transfer method.

In another aspect, there is provided a non-transitory computer-readable storage medium storing instructions that when executed by a processor of a computer system cause the computer system to: receive a signal from a remote electronic device via a network, the received signal representing information including a context for a transfer of value between a database record associated with a data sender and a database record associated with a data receiver, the context including an identifier for the data receiver; obtain a condition to be satisfied in performing the transfer of value based on the identifier for the data receiver; determine that the condition is satisfied by performing the transfer of value using a particular data transfer method; and enable the transfer of value using the particular data transfer method.

It may be desirable to automatically determine whether a particular data transfer method is suitable for a particular transfer of value (i.e., whether a first data transfer method is suitable). In particular, a particular data transfer method may have various characteristics or conditions on its completion. Such characteristics may make the particular data transfer method suitable or unsuitable for a particular transfer of value depending on conditions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a sender electronic device 100, a receiver server 110, and a data transfer server 120 communicate via a network 130.

Each of the sender electronic device 100, the receiver server 110, and the data transfer server 120 may be in geographically disparate locations. Put differently, one or more of the sender electronic device 100, the receiver server 110, and the data transfer server 120 may be remote to others of the sender electronic device 100, the receiver server 110, and the data transfer server 120.

The receiver server 110 and the data transfer server 120 are computer systems. Computer systems may be, for example, a mainframe computer, a minicomputer, or the like. Computer systems may include one or more computing devices. For example, a computer system may include multiple computing devices such as, for example, database servers, compute servers, and the like. The multiple computing devices may be in communication using a computer network. For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The sender electronic device 100 is also a computing device. In some embodiments, the sender electronic device 100 may, as illustrated, be a personal computer. However, the sender electronic device 100 may be a computing device of another type such as a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the sender electronic device 100 may be associated with one or more users. For instance, a user may operate the sender electronic device 100 to cause the electronic device to perform one or more operations consistent with the disclosed embodiments. In some embodiments, the sender electronic device 100 may include a smart card, chip card, integrated circuit card (ICC), and/or other card having an embedded integrated circuit.

Transfers of value may be between records in the same database or between records in different databases. It may be that multiple data transfer methods are available that can be used to perform a particular transfer of value. The data transfer server 120 is associated with at least one data transfer method that may be used to perform transfers of value. Depending on circumstances, a particular data transfer method (e.g., a first data transfer method) associated with the data transfer server 120 may or may not be suitable for satisfying a particular need for a transfer of value. For example, it may be that the sender needs to send a transfer of value to a receiver. The receiver may, however, set certain conditions that the transfer of value must satisfy. As further described below, the data transfer server 120 may, further to a notification of a transfer of value to be performed, obtain conditions on that transfer of value and determine based on those conditions whether a particular data transfer method associated with the data transfer server 120 is suitable for performing that transfer of value. If the particular data transfer method (e.g., the first data transfer method) associated with the data transfer server 120 is suitable for performing the transfer of value, then the data transfer server 120 may enable that method.

Figure 2:
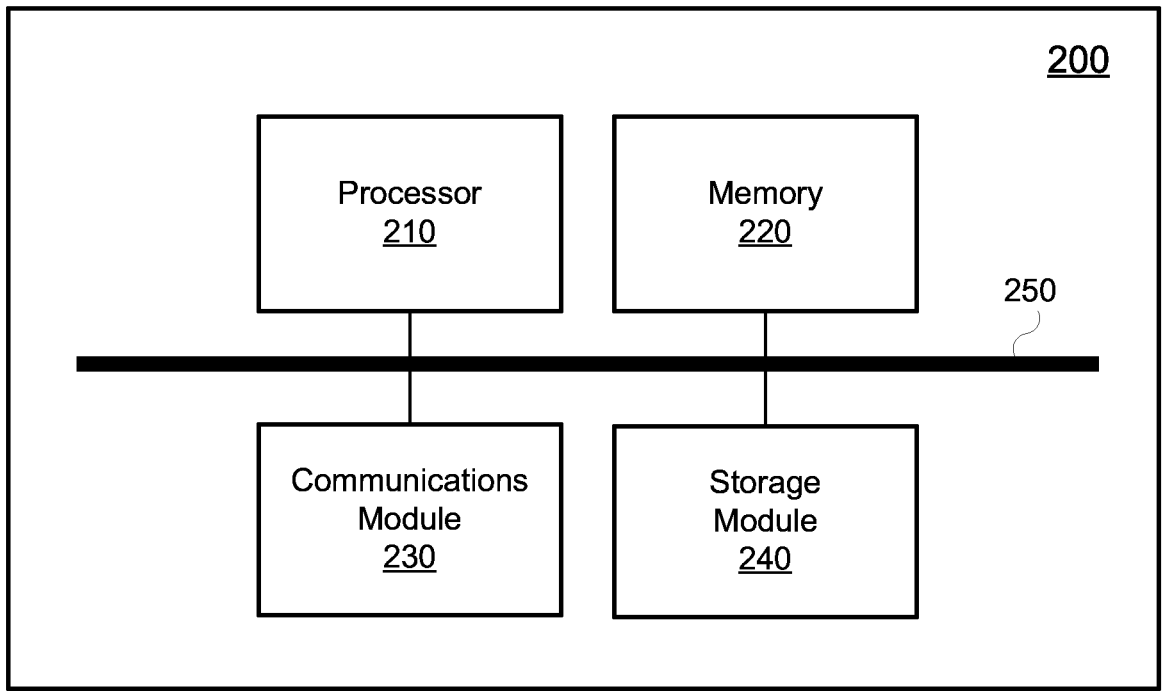
FIG. 2 is a high-level operation diagram of an example computing device.

FIG. 2 is a high-level operation diagram of an example computing device 200. In some embodiments, example computing device 200 may be exemplary of one or more of the sender electronic device 100, the receiver server 110, and the data transfer server 120. As will be discussed in greater detail below, each of the sender electronic device 100, the receiver server 110, and the data transfer server 120 includes software that adapts it to perform a particular function. More particularly, software of each of the sender electronic device 100, the receiver server 110, and the data transfer server 120 cooperates, with communication between the sender electronic device 100, the receiver server 110, and the data transfer server 120, to selectively enable a particular data transfer method associated with the data transfer server 120 depending on conditions that must be satisfied by a particular transfer of value.

The example computing device 200 includes a variety of modules. For example, as illustrated, the example computing device 200 may include a processor 210, a memory 220, a communications module 230, and a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
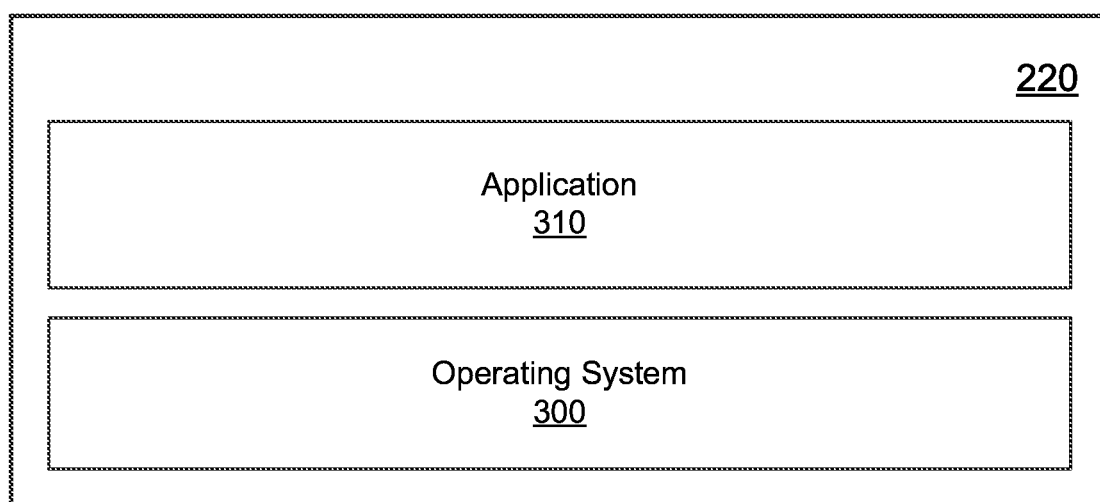
FIG. 3 depicts an example simplified software organization of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple OSX™ or the like.

The application 310 adapts the example computing device 200, in combination with the operating system 300, to operate as a device to a particular function. For example, the application 310 may cooperate with the operating system 300 to adapt a suitable embodiment of the example computing device 200 to operate as the sender electronic device 100, the receiver server 110, or the data transfer server 120.

Figure 4:
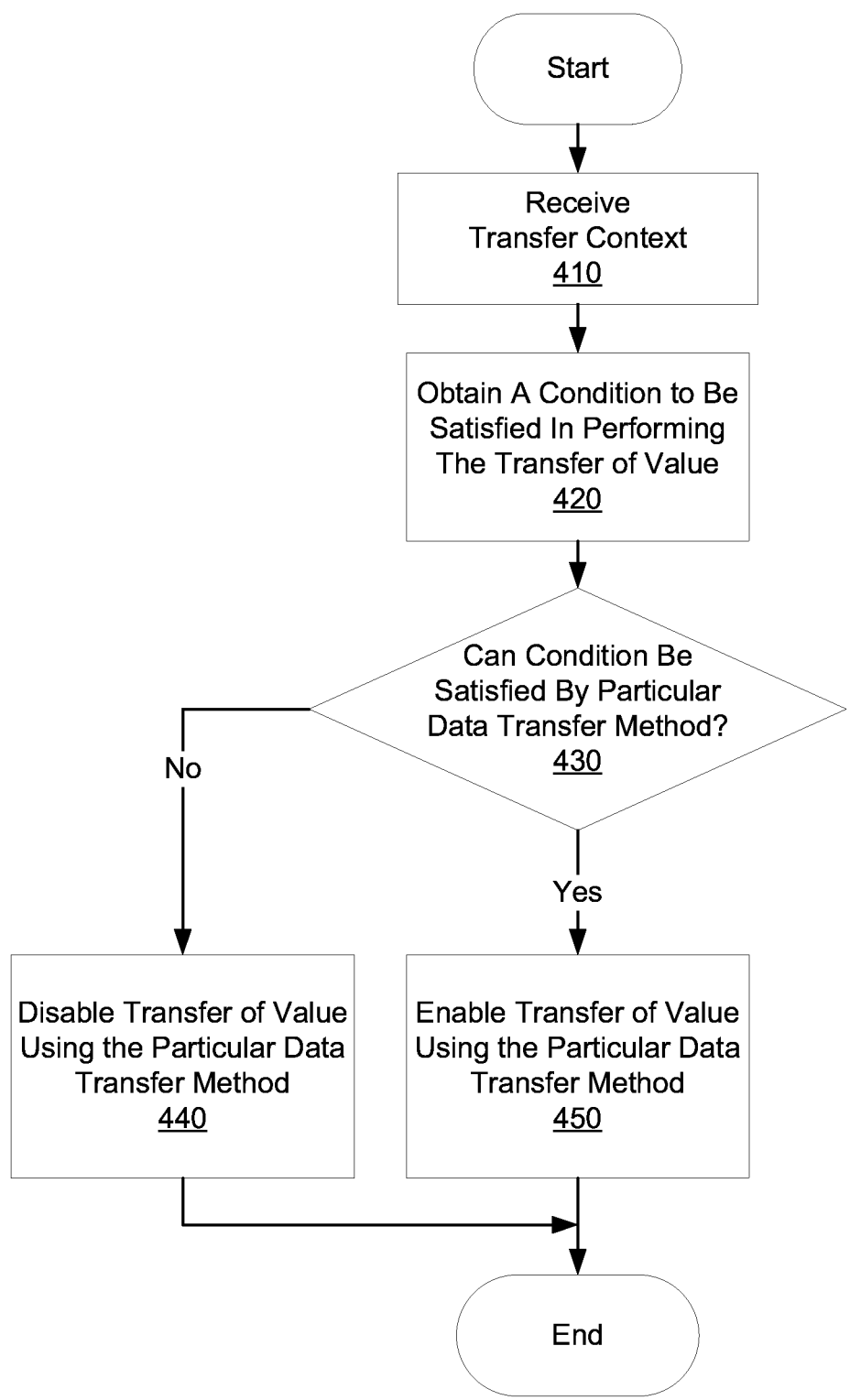
FIG. 4 is a flow chart depicting example operations performed by a value transfer server in selectively enabling a particular data transfer method.

Operations of the sender electronic device 100, the receiver server 110, and the data transfer server 120 will be described below with reference to FIG. 4.

As discussed above, the data transfer server 120 may selectively enable a particular data transfer method (e.g., a first data transfer method) associated therewith depending on conditions. The operation of the data transfer server 120 in determining whether to enable a particular data transfer method for a given transfer of value is described with reference to a flow chart 400 of FIG. 4. Operations 410 and onward are performed by one or more processors of a computing device, such as for example the processor 210 of a suitably configured instance of the example computing device 200, executing software such as, for example, a suitable instance of the application 310.

In the following description of the flow chart 400, discussion is made of various messages being sent and received via a computer network such as, for example, network 130. Messages correspond to signals received via a computer network representing information that, conceptually, is contained in a particular message. Various techniques and protocols may be used for exchanging messages. For example, in some embodiments, messages may be sent using some protocol for exchanging messages over a computer network. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that the messages correspond to Simple Object Access Protocol (SOAP) messages or to calls to and results from a REpresentational State Transfer (REST) API.

At the operation 410, the data transfer server 120 receives a context from the sender electronic device 100 via a network such as, for example, the network 130. The context may be received as or as a part of a message. In a particular example, where the data transfer server 120 is a suitably configured embodiment of the example computing device 200, the data transfer server 120 may receive the context using the communications module 230.

The context is for a transfer of value between a database record associated with a data sender and a database record associated with a data receiver. The context may include information about the transfer of value. For example, the context may include an identifier for the aforementioned data receiver.

In some embodiments, a transfer of value between database records may correspond to a funds transfer between financial accounts. In other words, one or both of the source and destination database records may correspond to a financial account. For example, it may be that the value being transferred corresponds to an account balance. It may also be that the database records correspond to accounts between which amounts are being transferred. As such, it may be that the data sender is a payor and the transfer of value represents a funds transfer to an account of the payee such as, for example, an account of the data receiver. In some such embodiments, it may be that the data transfer server 120 corresponds to an issuer associated with a payment account. For example, the payment account may belong to a customer corresponding to the data sender. Such a payment account may, for example, be for a particular payment method to which the particular data transfer method corresponds. In a particular example, the data transfer server 120 may be associated with an issuer of payment cards such as, for example, a Visa™ card issuer. In some such embodiments, it may be that the databases correspond to particular financial institutions or subdivisions thereof. For example, it may be that the databases store information relating to accounts in particular geographical regions, such as, for example, particular states/provinces or groupings thereof, and/or for particular customer segments such as, for commercial and retail customer accounts.

The transfer of value may be initiated by or using a website associated with the data receiver. For example, where the transfer of value corresponds to a funds transfer, the website could be an e-commerce website and the transfer of value may correspond to a transfer of funds made in order to pay for a purchase such as may be made using the website. It may be that the transfer of value is initiated as a part of accessing such a website using the sender electronic device 100. In some such embodiments, the identifier for the data receiver included in the context may be associated with the aforementioned website associated with the data receiver. For example, the identifier may be a uniform resource locator (URL) associated with the website.

In embodiments where the transfer of value is initiated by or using a website that is in some way associated with a website associated with the data receiver, it may be that the context is sent from the sender electronic device 100 to the computer system by way of a web browser used to access such a website. For example, it may be that the context is sent via a web browser plug-in (also known as an extension) executing in the aforementioned web browser on the sender electronic device 100 such as when the web browser is used to access the website associated with the data receiver. In a particular example, the context may be sent when the web browser accesses a particular page of such a website, such as, for example, a checkout page. The sending of the context may be triggered by user interaction with the page. For example, it may be that the plug-in causes an element to be displayed that, if clicked on or otherwise selected by a user, causes the context to be sent. The plug-in may obtain the data provided in the context in a variety of fashions. For example, some or all of the information may be derived from a profile of the user such as, for example, may be accessed from a remote server. For example, a remote server may be accessed using credentials provided by the user when the plug-in was initially configured. For example, where the transfer of value corresponds to a funds transfer, the information may be obtained from a financial institution associated with the user. In another example, the plug-in may extract information from the page such as, for example, to include in the context. For example, the plug-in may employ "screen scraping" techniques and/or may extract information based on a template for the website such as, for example, for the checkout page of a particular retailer.

As noted above, the context can include information about the transfer of value. For example, where the transfer of value corresponds to a funds transfer, it may be that the context includes information related to a contract or transaction such as, for example, a purchase. In a particular example, the context may include a tax amount, a shopping cart contents, a shipping address, and/or information, such as, for example, a URL, regarding a relevant party. A relevant party may, for example, be a payment processor and the information regarding the relevant party may be, for example, be a URL of the payment processor. Additionally or alternatively, the context may include a data object model (DOM) and/or a webpage structure and, potentially, an associated URL, such as, for example where transfer of value is initiated by or using a website associated with the data receiver. For example, the DOM, the webpage structure, and/or the URL may correspond to one or more pages of such a website. In some embodiments, the DOM may include a total transaction amount, a tax amount, a shopping cart contents, shipping information, and/or information about a payment processor such as, for example, a URL of the payment processor. In some embodiments, some or all of the information in the context may be logged or stored. Conveniently, logging or storing the context information may allow additional services to be provided such as, for example, based on the address or shopping cart contents. For example, logged information may be used in aggregate to improve fraud detection.

Following receipt of the context at the operation 410, control flow proceeds to an operation 420.

At the operation 420, the data transfer server 120 obtains a condition to be satisfied in performing the transfer of value to which the context relates. The obtained condition may take a variety of forms as further described below. For example, it may be that the condition includes one or more requirements on the transfer of value. Conditions may be obtained in a variety of fashions such as, for example, as further described below.

In one example of obtaining a condition, it may be that a condition is determined at the data transfer server 120. For example, the data transfer server may determine a condition based on information in the context.

In a particular example of a condition determined at the data transfer server 120, where the transfer of value corresponds to a funds transfer, it may be that the context provides information about the funds transfer. It may then, for example, be that a condition is determined by the data transfer server 120 based on the information about the funds transfer. For example, the context may include an amount of a transfer and the condition may be determined by the data transfer server 120 based on the amount of the transfer.

In another example, the data transfer server 120 may retrieve a condition from storage such as, for example, based on information in the context. For example, the data transfer server 120 may perform a look-up against a table of conditions corresponding to funds transfers of amounts falling in particular ranges in order to retrieve a condition. Where the data transfer server 120 is a suitably configured instance of the example computing device 200, the data transfer server 120 may retrieve a condition from storage based on information in the context using the storage module 240.

In a particular example of retrieving a condition from storage, as noted above the context may include an identifier for the data receiver. The data transfer server 120 may use this identifier and, additionally or alternatively, other data from the context in order to obtain a condition. For example, it may be that conditions were previously defined or negotiated with particular data receivers. Accordingly, such a condition may be retrieved based on the identifier for the data receiver. In a particular example, it may be that the stored conditions are established for the data receiver as a part of an onboarding process to allow the data receiver to receive data transfers using the particular data transfer method.

In another example, it may be that the condition is determined by communicating with another computer system. In a particular example, the data transfer server 120 may communicate with the receiver server 110. For example, where the receiver server 110 provides a set of callback methods such as, for example, by providing a REST API, the data transfer server 120 may call one or more of those methods to obtain a condition. The data transfer server 120 may communicate with the computer system associated with the receiver by sending a request for a condition to be satisfied in performing the transfer of value. The data transfer server 120 may, for example, send the request via a network such as, for example, the network 130. The data transfer server may send a signal representing information including the request. In other words, a sent signal may represent information including the request. Such a signal may, for example, be sent using the communications module 230 in embodiments where the data transfer server 120 is a suitably configured instance of the example computing device 200.

In communicating with another computer system, it may be necessary for the data transfer server 120 to identify such a computer system. For example, the data transfer system may need to identify the computer system associated with the receiver. In some embodiments, the data transfer server 120 may make such an identification based on information in the context. For example, the data transfer server 120 may determine an address of the computer system associated with the data receiver based on the identifier for the data receiver received at the operation 410. In a particular example, the data transfer server 120 may lookup the identifier for the data receiver in a previously populated database or lookup table. Such a database or lookup table may, for example, be accessed using the storage module 240 in embodiments where the data transfer server 120 is a suitably configured instance of the example computing device 200.

Responsive to the request sent to the computer system associated with the data receiver, the data transfer server 120 may receive a response indicating the condition to be satisfied in performing the transfer of value based on the identifier for the data receiver. Analogous to the request, the reply may be received via a network such as, for example, the network 130. The reply may, for example, be received by the data transfer server 120 using the communications module 230 in embodiments where the data transfer server 120 is a suitably configured instance of the example computing device 200.

Once a condition is obtained at the operation 420, control flow proceeds to an operation 430.

At the operation 430, the data transfer server 120 determines whether the condition obtained at the operation 420 can be satisfied by a particular data transfer method (e.g., by a first data transfer method).

As noted above, conditions may take a variety of forms. For example, it may be that the conditions relate to particular aspects or properties of the particular data transfer method (e.g., a first data transfer method).

As conditions may take a variety of forms, determining whether a condition is satisfied may take a corresponding variety of forms. In a first example, a condition to be satisfied in performing the transfer of value may include a maximum transfer of value latency. For example, a maximum transfer of value latency may be defined by the data receiver. A data receiver may define a maximum transfer of value latency on an overall basis or on another basis such as, for example, on a per-transfer of value basis. It may, for example, be that a maximum transfer of value latency is included in a condition received from a receiver computer system in manners described above. Additionally or alternatively, it may be that a maximum transfer of value latency is determined based on a predefined arrangement with a particular data receiver associated with the transfer of value. For example, it may be that a maximum transfer of value latency is to be associated with all transfers to the particular data receiver. In another example, a maximum transfer of value latency may be selected from a set of predefined conditions. A particular predefined condition may be selected, for example, based on information such as may be included in the context.

Latency may be incurred by a particular data transfer of value method for a variety of reasons. For example, latency may be introduced by a communications medium utilized by the transfer of value method (e.g., a first data transfer method may use a particular communications medium that may introduce latency). Additionally or alternatively, latency may be introduced by processing involved in a particular data transfer of value. For example, latency may be introduced if batch processing techniques are employed, as a transfer of value using such a particular data transfer method may have to wait for a particular batch to run. Notably, latency incurred may be a function of when a particular transfer of value is performed. For example, in the case of a batch transfer where batches are run at predetermined times, the latency incurred may be shorter for a transfer initiated close to such a predetermined time as compared to a transfer initiated at another time such as, for example, just after a batch completes.

In another example of how latency may be introduced, latency may be introduced where a particular data transfer method involves one or more intermediary computer systems. Notably, an intermediary system may introduce latency for a variety of reasons. For example, communications between a computer system associated with the database storing the database record associated with the data sender and an intermediary computer system may introduce latency. Additionally or alternatively, communications between intermediary computer systems may introduce latency. Additionally or alternatively, communications between an intermediary computer system and a computer system associated with a database storing the database record associated with the data receiver may introduce latency. Additionally or alternatively, latency may be introduced by data processing such as may occur at, for example, an intermediary. For example, an intermediary may need to perform processing such as for example, to translate messages between formats. In another example, an intermediary may store messages and forward them onward at some later time. In a particular example, an intermediary may employ batch processing techniques for message translation and or forwarding. As explained above, the use of batch processing techniques may introduce latency.

Where the condition includes a maximum transfer of value latency and the particular data transfer method involves one or more intermediary systems, determining that the condition is satisfied by performing the transfer of value using the particular data transfer method may include determining that the latency introduced by involving the various intermediary systems results in an overall transfer of value latency less than the maximum transfer of value system. In a particular example, where there is a single intermediary system, it may be that determining that the condition is satisfied by performing the transfer of value using the particular data transfer method includes determining that the latency introduced by involving that intermediary system results in an overall latency less than the maximum transfer of value latency.

In embodiments where the transfer of value corresponds to a funds transfer, latency may be introduced by processes used for transferring funds between accounts. For example, where the source and database records correspond to accounts with different financial institutions—i.e. an interbank transfer—and/or, in some cases, with different regional operations of a financial institution, it may be that interbank transfer mechanisms such as, for example, interbank settlement transfers, wire transfers, and/or automated clearinghouse (ACH) transfers are used to perform a transfer between the bank accounts. Notably, these mechanisms may introduce latency such as, for example, in manners described above. For example, they may introduce latency due to communications and/or data processing. In a particular example, funds may be transferred from the source account into a holding account where they will rest until a scheduled bulk transfer such as, for example, an interbank settlement, is initiated. Notably, the use of particular intermediaries such as, for example, correspondent banks, the Bank of Canada, and/or U.S. Federal Reserve Banks may introduce latency based on characteristics or policies of those intermediaries. By contrast, where the source and database records correspond to accounts with the same financial institution—i.e. an intra-bank transfer—it may be that no intermediary is necessary and/or that any latency involved in a transfer of value is minimal. For example, it may be possible to transfer funds between accounts with the same financial institution in real time or near real time.

In a second example, a condition to be satisfied in performing the transfer of value may include a maximum input/output variance. For example, a maximum input/output variance may be defined by the data receiver. A data receiver may define a maximum input/output variance on an overall basis or on some other basis such as, for example, a per transfer of value basis. It may be that a maximum input/output variance is included in a condition received from a receiver computer system in manners described above. For example, it may be that a maximum input/output variance is to be associated with all transfers to the particular data receiver. In another example, a maximum input/output variance may be selected from a set of predefined conditions. A particular predefined condition may be selected, for example, based on information such as may be included in the context.

Input/output variance may be introduced by and/or characteristic of a particular data transfer mechanism. For example, it may be that a variance in the value transferred may be introduced by data translation by intermediary systems.

In embodiments where the transfer of value corresponds to a funds transfer, input/output variance may arise a result of a difference between the value represented in or debited from the database record associated with the data sender and an amount represented in or credited to the database record associated with the data receiver. Such a variance may, for example, represent a cost or interchange fee associated with the particular data transfer method and may be, for example, a fixed amount, a percentage, or some combination thereof. In some embodiments, the variance may be tiered based on the value being transferred. In another example, where the particular data transfer method corresponds to a direct debit from an account associated with the data sender such as, for example, where the data sender has an account with a financial institution associated with the data transfer server 120, it may be that the variance corresponds to a fee for that service. Such costs or interchange fees may represent a payment to compensate an owner and/or operator associated with the particular data transfer method or an aspect thereof. Such a payment may be particular to the data sender and/or the data receiver. For example, it may be that the payment is negotiated as a part of an onboarding process for the data receiver as was described above. Additionally or alternatively, where the particular data transfer method involves an intermediary system, the variance may arise due to difference between an amount represented in information received by the intermediary and an amount represented in information as forwarded by the intermediary. Such a difference in value may reflect, for example, a fee to an intermediary such as for example, a fee to a correspondent bank.

As suggested above, the condition may include more than one requirement on the transfer of value. For example, it may be that the condition to be satisfied in the transfer of value includes both a maximum input/output variance and a maximum transfer of value latency. Such conditions may require that all, some, or at least one of such requirements be satisfied in order to consider that the condition would be satisfied by a particular data transfer method. Put differently, requirements may be combined such as using Boolean expressions that include, for example, disjunctions and conjunctions and/or combinations thereof.

As noted above, at the operation 430, the data transfer server 120 determines whether the condition is satisfied by performing the transfer of value using a particular data transfer method. If the data transfer system determines that the condition is not satisfied by performing the transfer of value using the particular data transfer method, control flow proceeds to an operation 440. Alternatively, if the data transfer system determines that the condition is satisfied by performing the transfer of value using the particular data transfer method, control flow proceeds to an operation 450.

At the operation 440, the data transfer server 120 disables the transfer of value using the particular data transfer method so as to prevent the particular data transfer method from being used to transfer value. Notably, this has the effect that the particular data transfer method is not enabled and/or is disabled because performing the transfer of value using that data transfer method cannot satisfy the condition.

Disabling the transfer of value using the particular data transfer method may take a variety of forms. For example, the data transfer server 120 may send one or more messages indicating that the particular data transfer method has been disabled for the transfer of value. In a particular example, the data transfer system may send such a message to one or more computer systems associated with the data sender and/or the data receiver. Such a message may involve sending a signal via a network such as, for example, the network 130. For example, where the data transfer system is a suitably configured embodiment of the example computing device 200, one or more messages may be sent using the communications module 230.

In some such embodiments, another data transfer method (i.e., a second data transfer method), different from the particular data transfer method (i.e., different from a first data transfer method which is the particular data transfer method evaluated at operation 430) in at least one aspect may be still be enabled. For example, it may be that another data transfer method (i.e., the second data transfer method) is always permitted whereas the particular data transfer method is only to be enabled when the condition can be satisfied. It may be, for example, that the other data transfer method is known to always satisfy the condition whereas the particular data transfer method may only satisfy the condition in some circumstances (necessitating the check). In other embodiments, the operations depicted in the flow chart 400 may be performed for more than one data transfer method, with each data transfer method being enabled or disabled depending on whether it can satisfy a corresponding condition for a particular transfer of value. In some such embodiments, it may be, for example, that all of the or several of the data transfer methods are considered against the same condition. In other embodiments may comparatively evaluate multiple data transfer methods and may the data transfer method that best satisfies the conditions may be enabled whereas the data transfer method that least satisfies the conditions may be disabled.

In a particular example, where the transfer of value corresponds to a funds transfer it may be that the particular data transfer method (i.e., a first data transfer method) corresponds to a bank transfer (i.e., a transfer between bank accounts). A bank account transfer may, for example, only be enabled if it can satisfy a maximum transfer of value latency (e.g., in the case of an interbank transfer as noted above) and/or a maximum input/output variance (e.g., a maximum interchange/transfer fee). By contrast, one or more other methods may also be considered or available. For example, as noted above a fallback method (i.e., a second data transfer method) may be permitted in all cases. Such a fallback method could, for example, be a credit payment such as, for example, using Visa™.

Figure 5:
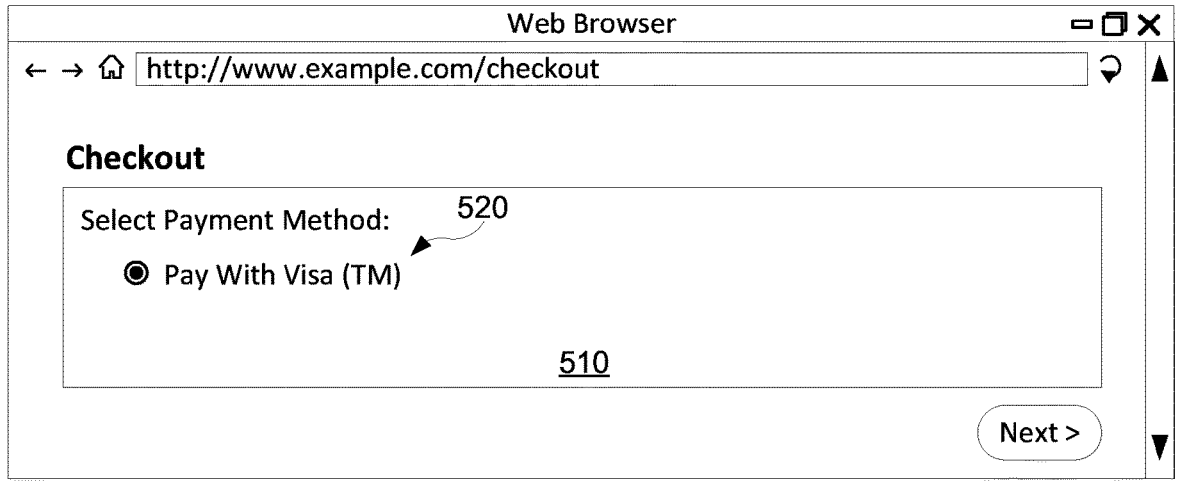
FIG. 5 is an example screen display of a sender electronic device.

In some embodiments, the sender electronic device 100 may provide a user interface allowing a user to select amongst data transfer methods. In a particular example, it may be, for example, that the choices for data transfer methods are bank account transfer and Visa™, the former perhaps being the particular data transfer method and the latter acting as a fallback option. As such, it may be, for example, that the former is not provided as an option if disabled. In a particular example, where the sender electronic device 100 is running a web browser, a user may be provided with the options in the web browser via a suitable web page. An example rendering 500 of such an web page is shown in FIG. 5. As illustrated, a checkout page includes a payment selection area 510. The payment selection area 510 includes a Visa™ payment option 520 but does not include a bank account transfer option as that particular data transfer method is not enabled. Alternatively, it some embodiments (not shown), it may be that a bank account transfer option is shown in payment selection are 510 but is unselectable or "greyed out".

As noted above, control flow may instead proceed to the operation 450 (instead of to the operation 440) if the data transfer system determines that the condition is satisfied by performing the transfer of value using the particular data transfer method.

At the operation 450, the data transfer server 120 enables the transfer of value using the particular data transfer method. Notably, this has the effect that the particular data transfer method is enabled and/or not disabled because performing the transfer of value using that data transfer method can satisfy the condition.

Enabling the transfer of value using the particular data transfer method may take a variety of forms. Further, it is noted that another data transfer method, different from the particular data transfer method in at least one aspect, may also be enabled at the same time either by default, as a fallback, or based on it satisfying some conditions, such as was described above.

In one example of enabling the transfer of value using the particular data transfer method, enabling the transfer of value using the particular data transfer method may include initiating the transfer of value using that method.

Additionally, in enabling the particular transfer of value method, the data transfer system may send a message to one or more computer systems associated with the data sender and/or the data receiver notifying that the transfer has been initiated.

Additionally or alternatively, once the transfer of value is completed, the data transfer system may send a message to one or more computer systems associated with the data sender and/or the data receiver notifying that the transfer has been completed. In a particular example, where a message is to be sent to a data receiver providing a REST API as described above, it may be that such messages correspond to one or more calls to such an API. For example, it may be that a POST is made to a callback URL providing a notification such as, for example, a notification that funds have been secured in embodiments where the transfer of value corresponds to a funds transfer. Additionally or alternatively, a message may be sent to the data sender. For example, where the sender electronic device 100 is running a web browser as described above, the web browser may be redirected to a completion URL such as for example, a transaction completion URL in the case of a where the transfer of value corresponds to a funds transfer to a merchant. In some embodiments, such a redirect may be made by way of the aforementioned web browser plug-in.

In a second example of enabling the particular transfer of value method, the data transfer server 120 may send one or more messages indicating the particular data transfer method. For example, the message may indicate that the particular data transfer method has been enabled for the transfer of value. In a particular example, the data transfer system may send such a message to one or more computer systems associated with the data sender and/or the data receiver. Such messages may notify the data sender and/or the data receiver that the particular data transfer method is available. Being so available, the particular data transfer method may, for example, be selected by the data sender and/or data receiver to perform the transfer of value. For example, such a selection may be made using a user interface.

Figure 6:
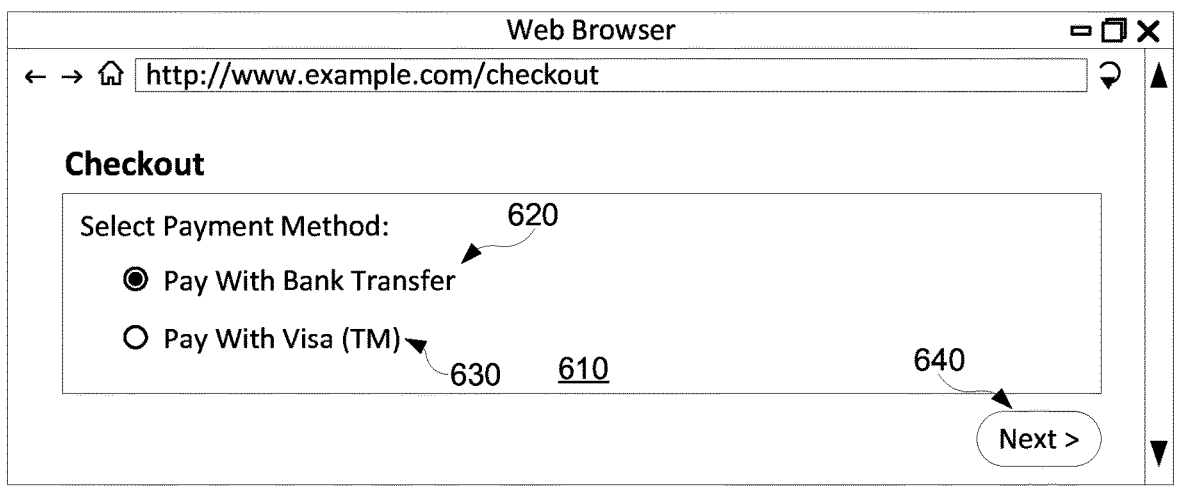
FIG. 6 is an example screen display of a sender electronic device.

In a particular example of a user interface, where the transfer of value corresponds to a funds transfer it may be that the particular data transfer method corresponds to a bank transfer (i.e., a transfer between bank accounts). As above, it may be that the sender electronic device 100 provides a user interface allowing a user to select amongst data transfer methods. In a particular example, it may be, for example, that the choices for data transfer methods are bank account transfer and Visa™, the former perhaps being the particular data transfer method and the latter acting as a fallback option. As such, it may be, for example, that both are provided as options if the former is not disabled. In a particular example, as noted above, where the sender electronic device 100 is running a web browser, a user may be provided with the options in the web browser via a suitable web page. An example rendering 600 of such an web page is shown in FIG. 6. As illustrated, a checkout page includes a payment selection area 610. The payment selection area includes both a bank transfer payment option 620 and a Visa payment option 630. Notably a user may select between the two options such as, for example, before clicking a button 640. In some embodiments, it may be that the user is provided with an incentive if one of the options is chosen. For example, it may be that if the user chooses the particular data transfer method of a bank transfer payment the user receives a rebate or "cashback reward" of some value. In a particular example, the user could be provided with a cashback reward equal to all or a portion of the savings that accrue to a financial institution from processing a particular funds transfer as a bank account transfer rather than by some other mechanism.

In any of the above examples, sending messages to various computer systems may involve sending a signal via a network such as, for example, the network 130. For example, where the data transfer system is a suitably configured embodiment of the example computing device 200, one or more messages may be sent using the communications module 230.

Further, it is noted that whether the particular data transfer method is enabled or is instead disabled, it the determination as to whether the data transfer method is to be enabled or disabled may be made in real time or near real time.

As such, even in cases where confirmation from the user is not required (such as, for example, where the particular data transfer method is assumed such as, for example, by prior arrangement with the data sender), it may still be necessary to make the determination in real time or near real time so that appropriate notification that the data transfer has been initiated/completed may be provided. Notably, whether user confirmation is required or not, it may be that any delay in making a determination (e.g. if it is not made in real time/near real time) may prevent the method of from being used in real-world applications, especially, for example, if the transfer of value is time sensitive such as, for example, in the case of an urgent or time sensitive payment.

Moreover, in the case where confirmation from the user is required as discussed above (such as, for example, by way of a user interface such as is illustrated in FIGS. 5 and 6) it may be that the determination must be made before or must be made coincident with sending/displaying a user interface or providing some other indication to a user as to available options and/or to receive confirmation that the transfer of value is to be performed using a data transfer method. For example, the systems and methods described herein may be used in conjunction with an e-commerce system and the operations described herein may be performed near instantaneously and automatically as part of a checkout process. Further, the techniques described herein may provide an improvement to database transfer techniques and may be particularly useful, for example, in ensuring latency is suitable for data transfers between databases.

The above described embodiments are merely by way of example and may be susceptible to one or more variations.

For example, in some embodiments, the method performed by the data transfer server 120 in determining whether to enable the particular data transfer method for a given transfer of value may further include sending an indication that the transfer of value has been enabled to a computer system associated with the data receiver. The address of such a computer system may be determined in manners consistent with the above description of determining an address of such a computer system in relation to requesting conditions therefrom. For example, it may be that an address of the computer system associated with the data receiver is determined based on the identifier for the data receiver included in the context. Sending messages to such a computer system may involve sending a signal via a network such as, for example, the network 130. For example, where the data transfer system is a suitably configured embodiment of the example computing device 200, such a message may be sent using the communications module 230.

In some embodiments, the data transfer server 120 may authenticate the sender electronic device 100. This may, for example, occur as a prerequisite to the data transfer server 120 determining whether to enable the particular data transfer method for a given transfer of value. Additionally or alternatively, it may also be that the sender electronic device 100 authenticates the data transfer server 120 such as, for example, before sending a context thereto. Put differently the sender electronic device 100 and the data transfer server 120 may mutually authenticate such as, for example, prior to initiating determination as to whether the particular data transfer method is to be enabled for a particular data transfer method.

In some embodiments, a condition to be satisfied by the particular data transfer method may be that the data transfer method is enabled and/or permitted for the data sender and/or the data receiver. For example, one or both of a data sender or a data sender may need to arrange to be able to be a party to transactions associated with data transfers using the particular data transfer method. For example, where the transfer of value corresponds to a funds transfer, it may be that the data sender is a customer of a financial institution associated with the data transfer server 120. The customer may need to arrange with the financial institution to be able to use the particular data transfer method such as, for example, by agreeing to terms and conditions and/or having an account of a required type. Similarly, it may be that the data receiver must arrange with a financial institution to be able to use a particular data transfer method. Such arranging may, for example, include completing an onboarding process as described above.

In some embodiments where the transfer of value corresponds to a funds transfer, it may be that a funds transfer is initiated by the data transfer server 120 using a mechanism subject to the Payment Card Industry (PCI) Data Security Standard (DSS). It may be that the funds transfer being initiated by the data transfer server 120 means that the data receiver (e.g., a merchant) does not learn of and/or need to know any of the sender's payment information (e.g., bank or card information). A data receiver that does not learn of payment information such as bank or card information may not be subject to PCI DSS. Conveniently, it may be that a system not subject to PCI DSS has lower associated costs for maintenance, operation, design, and/or overall security as compared to a system subject to PCI DSS.

As discussed above, in some embodiments the data receiver may provide an API such as, for example, a REST API for callback purposes. As noted above, it may that, in the particular example of transfer of value corresponding to a transfer of funds, the data receiver corresponds to a merchant. Such a merchant may, for example, providing a callback API providing the data transfer server 120 (which may, in some such embodiments, correspond to an issuer or other financial institution) with one or more callbacks. Such a callback API may be accessed based some manner of a registry for data receivers such as may be populated, for example, as a part of an onboarding process for data receivers as discussed above. Additionally or alternatively, an address or web service description of the callback API may be included in the context. Such a callback API may provide a variety of functionality. For example, the callback API may allow the data transfer server 120 to GET or otherwise retrieve the merchant's bank account detail (which may, for example, act as the database record associated with the data receiver). Additionally or alternatively, the callback API may allow the data transfer server 120 to GET or otherwise retrieve a maximum input/output variance such as, for example, a maximum interchange rate the merchant is willing to accept. Such a callback may, for example, be accessed in obtaining a condition to be satisfied in performing the funds transfer such as, for example, at the operation 420 above. Additionally or alternatively, the callback API may allow the data transfer server 120 to GET or otherwise retrieve a maximum data transfer latency such as, for example, a maximum settlement time the merchant is willing to wait for the transferred funds. Such a callback may, for example, be accessed in obtaining a condition to be satisfied in performing the funds transfer such as, for example, at the operation 420 above. Additionally or alternatively, the callback API may allow the data transfer server 120 to GET or otherwise retrieve a transaction completion URL to which there may be redirect after a successful transfer of value as described above. For example, as described above, where the sender electronic device 100 is running a web browser, the web browser may be redirected to such a completion URL such as, for example, by way of the aforementioned plug-in. Additionally or alternatively, the callback API may allow the data transfer server 120 to PUT or otherwise provide the merchant with a notification that the transfer of value has completed to such a point that completion thereof is guaranteed. For example, such a notification may be provided if funds have been debited to a bank account associated with the data sender and transferred to a bank account associated with the merchant such as, for example, the account specified by the above noted bank account detail.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted. certain adaptations and modifications of the described embodiments can be made. Therefore, the above discussed embodiments are considered to be illustrative and not restrictive.

What is claimed is:

1. A computer system, the computer system comprising:
a processor;
a communications module coupled to the processor; and,
a memory coupled to the processor and storing instructions that, when executed by the processor, cause the computer system to:
receive a control from a remote electronic device via a network using the communications module, the received control representing information including a context for a transfer of value between a database record associated with a data sender and a database record associated with a data receiver, the context including an identifier for the data receiver;
obtain a condition to be satisfied in performing the transfer of value based on the identifier for the data receiver, wherein the condition includes at least one of a maximum input/output variance defined by the data receiver and a maximum transfer of value latency defined by the data receiver;
determine that the condition is satisfied by performing the transfer of value using a particular data transfer method; and
when it is determined that the condition is satisfied, enable the transfer of value using the particular data transfer method.

2. The computer system of claim 1 wherein the condition includes the maximum transfer of value latency defined by the data receiver and wherein the particular data transfer method involves an intermediary system and wherein determining that the condition is satisfied by performing the transfer of value using the particular data transfer method comprises the computer system determining that a latency introduced by involving the intermediary system results in an overall transfer of value latency less than the maximum transfer of value latency.

3. The computer system of claim 1, wherein obtaining the condition to be satisfied in performing the transfer of value based on the identifier for the data receiver includes the computer system:
sending a another control to a computer system associated with the data receiver via the network using the communications module, the sent another control representing information including a request for the condition to be satisfied in performing the transfer of value, wherein an address of the computer system is determined based on the identifier for the data receiver; and
receiving said another control from the computer system associated with the data receiver via the network using the communications module, the received another control representing information including a response indicating the condition to be satisfied in performing the transfer of value based on the identifier for the data receiver.

4. The computer system of claim 1, wherein the instructions further cause the computer system to:
send a control to a computer system associated with the data receiver via the network using the communications module, the sent control representing information including an indication that the transfer of value has been enabled, wherein an address of the computer system associated with the data receiver is determined based on the identifier for the data receiver.

5. The computer system of claim 1 wherein enabling the transfer of value using the particular data transfer method includes initiating the transfer of value using the particular data transfer method.

6. The computer system of claim 1 wherein enabling the transfer of value includes the computer system sending said control to at least one of the data sender and the data receiver, the control representing information including an indication of the particular data transfer method, the particular data transfer method being selectable by the at least one of the data sender and the data receiver to perform the transfer of value.

7. The computer system of claim 1, wherein the transfer of value is initiated via a website associated with the data receiver and wherein the identifier for the data receiver includes a uniform resource locator associated with the website.

8. The computer system of claim 7, wherein the control representing information including the context is sent from the remote electronic device to the computer system via a web browser plug-in executing in a web browser used to access the website of the data receiver on the remote electronic device.

9. The computer system of claim 1, wherein the data sender includes a payor and the data receiver includes a payee and the transfer of value represents a funds transfer to an account of the payee.

10. The computer system of claim 9, wherein the context for the transfer of value further includes at least one of a tax amount, a shopping cart contents, a shipping address, and a uniform resource locator of a payment processor.

11. A computer-implemented method comprising:
receiving a control from a remote electronic device via a network, the received control representing information including a context for a transfer of value between a database record associated with a data sender and a database record associated with a data receiver, the context including an identifier for the data receiver;
obtaining a condition to be satisfied in performing the transfer of value based on the identifier for the data receiver, wherein the condition includes at least one of a maximum input/output variance defined by the data receiver and a maximum transfer of value latency defined by the data receiver;
determining that the condition is satisfied by performing the transfer of value using a particular data transfer method; and
when it is determined that the condition is satisfied, enabling the transfer of value using the particular data transfer method.

12. The computer-implemented method of claim 11 wherein the condition includes the maximum transfer of value latency defined by the data receiver and wherein the particular data transfer method involves an intermediary system and wherein determining that the condition is satisfied by performing the transfer of value using the particular data transfer method comprises determining that a latency introduced by involving the intermediary system results in an overall latency less than the maximum transfer of value latency.

13. The computer-implemented method of claim 11, wherein obtaining the condition to be satisfied in performing the transfer of value based on the identifier for the data receiver comprises:
sending a another control to a computer system associated with the data receiver via the network, the sent another control representing a request for the condition to be satisfied in performing the transfer of value, wherein an address of the computer system is determined based on the identifier for the data receiver; and receiving said another control from the computer system associated with the data receiver via the network, the received another control representing information including a response indicating the condition to be satisfied in performing the transfer of value based on the identifier for the data receiver.

14. The computer-implemented method of claim 11 wherein enabling the transfer of value using the particular data transfer method comprises at least one of:

initiating the transfer of value using the particular data transfer method, and sending another control to at least one of the data sender or the data receiver, the sent another control representing information including an indication of the particular data transfer method, the particular data transfer method being selectable by the at least one of the data sender or the data receiver to perform the transfer of value.

15. The computer-implemented method of claim 11, wherein the transfer of value is initiated via a website associated with the data receiver and wherein the identifier for the data receiver includes a uniform resource locator associated with the website.

16. The computer-implemented method of claim 11, wherein the data sender includes a payor and the data receiver includes a payee and the transfer of value represents a funds transfer to an account of the payee.

17. The computer-implemented method of claim 11, wherein the context for the transfer of value further includes at least one of a tax amount, a shopping cart contents, a shipping address, and a uniform resource locator of a payment processor.

18. A non-transitory computer-readable storage medium storing instructions that when executed by a processor of a computer system cause the computer system to:

receive a control from a remote electronic device via a network, the received control representing information including a context for a transfer of value between a database record associated with a data sender and a database record associated with a data receiver, the context including an identifier for the data receiver;

obtain a condition to be satisfied in performing the transfer of value based on the identifier for the data receiver, wherein the condition includes at least one of a maximum input/output variance defined by the data receiver and a maximum transfer of value latency defined by the data receiver;

determine that the condition is satisfied by performing the transfer of value using a particular data transfer method; and when it is determined that the condition is satisfied, enable the transfer of value using the particular data transfer method.

19. A computer system, the computer system comprising:
a processor;
a communications module coupled to the processor; and,
a memory coupled to the processor and storing instructions that, when executed by the processor, cause the computer system to:

receive a control from a remote electronic device via a network using the communications module, the received control representing information including a context for a transfer of value between a database record associated with a data sender and a database record associated with a data receiver, the context including an identifier for the data receiver;

obtain a condition to be satisfied in performing the transfer of value based on the identifier for the data receiver, wherein obtaining the condition includes the computer system:

sending a another control to a computer system associated with the data receiver via the network using the communications module, the sent another control representing information including a request for the condition to be satisfied in performing the transfer of value, wherein an address of the computer system is determined based on the identifier for the data receiver; and receiving said another control from the computer system associated with the data receiver via the network using the communications module, the received another control representing information including a response indicating the condition to be satisfied in performing the transfer of value based on the identifier for the data receiver;

determine that the condition is satisfied by performing the transfer of value using a particular data transfer method; and when it is determined that the condition is satisfied, enable the transfer of value using the particular data transfer method.

20. The computer system of claim 19 wherein the condition to be satisfied in performing the transfer of value includes at least one of a maximum input/output variance defined by the data receiver and a maximum transfer of value latency defined by the data receiver; and wherein the condition includes the maximum transfer of value latency defined by the data receiver and wherein the particular data transfer method involves an intermediary system and wherein determining that the condition is satisfied by performing the transfer of value using the particular data transfer method comprises the computer system determining that a latency introduced by involving the intermediary system results in an overall transfer of value latency less than the maximum transfer of value latency.

21. The computer system of claim 19, wherein the instructions further cause the computer system to:

send said another control to a computer system associated with the data receiver via the network using the communications module, the sent another control representing information including an indication that the transfer of value has been enabled, wherein an address of the computer system associated with the data receiver is determined based on the identifier for the data receiver.

22. The computer system of claim 19 wherein enabling the transfer of value using the particular data transfer method includes initiating the transfer of value using the particular data transfer method.

23. The computer system of claim 19 wherein enabling the transfer of value includes the computer system sending said control to at least one of the data sender and the data receiver, the control representing information including an indication of the particular data transfer method, the particular data transfer method being selectable by the at least one of the data sender and the data receiver to perform the transfer of value.

24. The computer system of claim 19, wherein the transfer of value is initiated via a website associated with the data receiver and wherein the identifier for the data receiver includes a uniform resource locator associated with the website.

25. The computer system of claim 24, wherein the control representing information including the context is sent from the remote electronic device to the computer system via a web browser plug-in executing in a web browser used to access the website of the data receiver on the remote electronic device.

26. The computer system of claim 19, wherein the data sender includes a payor and the data receiver includes a payee and the transfer of value represents a funds transfer to an account of the payee.

27. The computer system of claim 26, wherein the context for the transfer of value further includes at least one of a tax amount, a shopping cart contents, a shipping address, and a uniform resource locator of a payment processor.

28. A computer-implemented method comprising:
receiving a control from a remote electronic device via a network, the received control representing information including a context for a transfer of value between a database record associated with a data sender and a database record associated with a data receiver, the context including an identifier for the data receiver;
obtaining a condition to be satisfied in performing the transfer of value based on the identifier for the data receiver, wherein obtaining the condition includes:
sending another control to a computer system associated with the data receiver, the sent another control representing information including a request for the condition to be satisfied in performing the transfer of value, wherein an address of the computer system is determined based on the identifier for the data receiver; and
receiving said another control from the computer system associated with the data receiver, the received another control representing information including a response indicating the condition to be satisfied in performing the transfer of value based on the identifier for the data receiver;
determining that the condition is satisfied by performing the transfer of value using a particular data transfer method; and
when it is determined that the condition is satisfied, enabling the transfer of value using the particular data transfer method.

29. The computer-implemented method of claim 28 wherein the condition to be satisfied in performing the transfer of value includes at least one of a maximum input/output variance defined by the data receiver and a maximum transfer of value latency defined by the data receiver; and wherein the condition includes the maximum transfer of value latency defined by the data receiver and wherein the particular data transfer method involves an intermediary system and wherein determining that the condition is satisfied by performing the transfer of value using the particular data transfer method comprises determining that a latency introduced by involving the intermediary system results in an overall latency less than the maximum transfer of value latency.

30. The computer-implemented method of claim 28 wherein enabling the transfer of value using the particular data transfer method comprises at least one of:
initiating the transfer of value using the particular data transfer method, and
sending said control to at least one of the data sender or the data receiver, the sent said control representing information including an indication of the particular data transfer method, the particular data transfer method being selectable by the at least one of the data sender or the data receiver to perform the transfer of value.

31. The computer-implemented method of claim 28, wherein the transfer of value is initiated via a website associated with the data receiver and wherein the identifier for the data receiver includes a uniform resource locator associated with the website.

32. The computer-implemented method of claim 28, wherein the data sender includes a payor and the data receiver includes a payee and the transfer of value represents a funds transfer to an account of the payee.

33. The computer-implemented method of claim 28, wherein the context for the transfer of value further includes at least one of a tax amount, a shopping cart contents, a shipping address, and a uniform resource locator of a payment processor.

34. A non-transitory computer-readable storage medium storing instructions that when executed by a processor of a computer system cause the computer system to:
receive a control from a remote electronic device via a network, the received control representing information including a context for a transfer of value between a database record associated with a data sender and a database record associated with a data receiver, the context including an identifier for the data receiver;
obtain a condition to be satisfied in performing the transfer of value based on the identifier for the data receiver, wherein obtaining the condition includes the computer system:
sending another control to a computer system associated with the data receiver, the sent another control representing information including a request for the condition to be satisfied in performing the transfer of value, wherein an address of the computer system is determined based on the identifier for the data receiver; and
receiving said another control from the computer system associated with the data receiver, the received another control representing information including a response indicating the condition to be satisfied in performing the transfer of value based on the identifier for the data receiver;
determine that the condition is satisfied by performing the transfer of value using a particular data transfer method; and
when it is determined that the condition is satisfied, enable the transfer of value using the particular data transfer method.

35. A computer system, the computer system comprising:
a processor;
a communications module coupled to the processor; and,
a memory coupled to the processor and storing instructions that, when executed by the processor, cause the computer system to:
receive a control from a remote electronic device via a network using the communications module, the received control representing information including a context for a transfer of value between a database record associated with a data sender and a database record associated with a data receiver, the context including an identifier for the data receiver;
obtain a condition to be satisfied in performing the transfer of value based on the identifier for the data receiver;

determine that the condition is satisfied by performing the transfer of value using a particular data transfer method; and when it is determined that the condition is satisfied, enable the transfer of value using the particular data transfer method, wherein enabling the transfer of value includes the computer system sending another control to at least one of the data sender and the data receiver, the another control representing information including an indication of the particular data transfer method, the particular data transfer method being selectable by the at least one of the data sender and the data receiver to perform the transfer of value.

36. The computer system of claim 35 wherein the condition to be satisfied in performing the transfer of value includes at least one of a maximum input/output variance defined by the data receiver and a maximum transfer of value latency defined by the data receiver; and wherein the condition includes the maximum transfer of value latency defined by the data receiver and wherein the particular data transfer method involves an intermediary system and wherein determining that the condition is satisfied by performing the transfer of value using the particular data transfer method comprises the computer system determining that a latency introduced by involving the intermediary system results in an overall transfer of value latency less than the maximum transfer of value latency.

37. The computer system of claim 35, wherein the instructions further cause the computer system to:

send said control to a computer system associated with the data receiver via the network using the communications module, the sent control representing information including an indication that the transfer of value has been enabled, wherein an address of the computer system associated with the data receiver is determined based on the identifier for the data receiver.

38. The computer system of claim 35 wherein enabling the transfer of value using the particular data transfer method includes initiating the transfer of value using the particular data transfer method.

39. The computer system of claim 35, wherein the transfer of value is initiated via a website associated with the data receiver and wherein the identifier for the data receiver includes a uniform resource locator associated with the website.

40. The computer system of claim 39, wherein the signal representing information including the context is sent from the remote electronic device to the computer system via a web browser plug-in executing in a web browser used to access the website of the data receiver on the remote electronic device.

41. The computer system of claim 35, wherein the data sender includes a payor and the data receiver includes a payee and the transfer of value represents a funds transfer to an account of the payee.

42. The computer system of claim 41, wherein the context for the transfer of value further includes at least one of a tax amount, a shopping cart contents, a shipping address, and a uniform resource locator of a payment processor.

43. A computer-implemented method comprising:

receiving a control from a remote electronic device via a network, the received control representing information including a context for a transfer of value between a database record associated with a data sender and a database record associated with a data receiver, the context including an identifier for the data receiver;

obtaining a condition to be satisfied in performing the transfer of value based on the identifier for the data receiver;

determining that the condition is satisfied by performing the transfer of value using a particular data transfer method; and when it is determined that the condition is satisfied, enabling the transfer of value using the particular data transfer method, wherein enabling the transfer of value includes sending another control to at least one of the data sender and the data receiver, the said another control representing information including an indication of the particular data transfer method, the particular data transfer method being selectable by the at least one of the data sender and the data receiver to perform the transfer of value.

44. The computer-implemented method of claim 43 wherein the condition to be satisfied in performing the transfer of value includes at least one of a maximum input/output variance defined by the data receiver and a maximum transfer of value latency defined by the data receiver; and wherein the condition includes the maximum transfer of value latency defined by the data receiver and wherein the particular data transfer method involves an intermediary system and wherein determining that the condition is satisfied by performing the transfer of value using the particular data transfer method comprises determining that a latency introduced by involving the intermediary system results in an overall latency less than the maximum transfer of value latency.

45. The computer-implemented method of claim 43 wherein enabling the transfer of value using the particular data transfer method includes initiating the transfer of value using the particular data transfer method.

46. The computer-implemented method of claim 43, wherein the transfer of value is initiated via a website associated with the data receiver and wherein the identifier for the data receiver includes a uniform resource locator associated with the website.

47. The computer-implemented method of claim 43, wherein the data sender includes a payor and the data receiver includes a payee and the transfer of value represents a funds transfer to an account of the payee.

48. The computer-implemented method of claim 43, wherein the context for the transfer of value further includes at least one of a tax amount, a shopping cart contents, a shipping address, and a uniform resource locator of a payment processor.

49. A non-transitory computer-readable storage medium storing instructions that when executed by a processor of a computer system cause the computer system to:

receive a control from a remote electronic device via a network, the received control representing information including a context for a transfer of value between a database record associated with a data sender and a database record associated with a data receiver, the context including an identifier for the data receiver;

obtain a condition to be satisfied in performing the transfer of value based on the identifier for the data receiver;

determine that the condition is satisfied by performing the transfer of value using a particular data transfer method; and when it is determined that the condition is satisfied, enable the transfer of value using the particular data transfer method, wherein enabling the transfer of value includes the computer system sending another control to at least one of the data sender and the data receiver, the said another control representing information including an indication of the particular data transfer method, the particular data transfer method being selectable by the at least one of the data sender and the data receiver to perform the transfer of value.

* * * * *